United States Patent
Gadde (10) Patent No.: US 7,359,381 B2
(45) Date of Patent: Apr. 15, 2008

(54) PARALLEL HARDWARE ARRANGEMENT FOR CORRELATING AN EXTERNAL TRANSPORT ADDRESS PAIR WITH A LOCAL ENDPOINT ASSOCIATION

(75) Inventor: Srinivas Gadde, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 868 days.

(21) Appl. No.: 10/769,183

(22) Filed: Jan. 30, 2004

(65) Prior Publication Data

US 2005/0169273 A1    Aug. 4, 2005

(51) Int. Cl.
*H04L 12/28*   (2006.01)
*H04J 3/24*    (2006.01)

(52) U.S. Cl. .................... 370/392; 370/475
(58) Field of Classification Search ........... 370/389, 370/395.3, 392, 395.54, 475, 238; 711/108, 711/117, 129, 140, 200; 709/238–242
See application file for complete search history.

(56) References Cited

U.S. PATENT DOCUMENTS

| | | | | |
|---|---|---|---|---|
| 6,147,976 | A * | 11/2000 | Shand et al. ............... | 370/254 |
| 6,421,342 | B1 * | 7/2002 | Schwartz et al. ........... | 370/392 |
| 6,473,846 | B1 * | 10/2002 | Melchior .................... | 711/170 |
| 6,618,760 | B1 * | 9/2003 | Aramaki et al. ............ | 709/240 |
| 6,772,348 | B1 * | 8/2004 | Ye ............................. | 726/13 |
| 6,804,241 | B2 * | 10/2004 | Schwartz et al. ........... | 370/392 |
| 6,922,410 | B1 * | 7/2005 | O'Connell .................. | 370/401 |
| 6,956,858 | B2 * | 10/2005 | Hariguchi et al. ..... | 370/395.31 |
| 6,975,631 | B1 * | 12/2005 | Kastenholz ................. | 370/401 |
| 7,028,098 | B2 * | 4/2006 | Mate et al. ................. | 709/238 |
| 2002/0080798 | A1 * | 6/2002 | Hariguchi et al. ..... | 370/395.31 |
| 2002/0172203 | A1 * | 11/2002 | Ji et al. ...................... | 370/392 |
| 2002/0186695 | A1 * | 12/2002 | Schwartz et al. ........... | 370/392 |
| 2003/0026259 | A1 * | 2/2003 | Brown ........................ | 370/392 |
| 2003/0131263 | A1 * | 7/2003 | Keane et al. ............... | 713/201 |
| 2005/0018682 | A1 * | 1/2005 | Ferguson et al. ........... | 370/392 |

OTHER PUBLICATIONS

Stewart. R., et al., "Stream Control Trnasmission Protocol," RFC2960.txt, The Internet Society, 2000, pp. 1-120.

* cited by examiner

*Primary Examiner*—Wing Chan
*Assistant Examiner*—Hong Sol Cho (57) ABSTRACT

An arrangement of data storage cells are accessed in parallel for correlating a transport address pair with a respective local association. In one embodiment, each cell may contain a transport address pair and a local association ID. In another embodiment, multiple stages of partitioned content addressable arrays may be employed, with at least a portion of the transport address pair used to access the first stage and at least a portion of an output from a preceding stage used to select a corresponding array in a succeeding stage.

19 Claims, 5 Drawing Sheets

PARALLEL HARDWARE ARRANGEMENT FOR CORRELATING AN EXTERNAL TRANSPORT ADDRESS PAIR WITH A LOCAL ENDPOINT ASSOCIATION

BACKGROUND

The present invention is generally related to the processing of multiple streams of received datagrams, and more specifically related to the association of each received datagram with a respective endpoint based on a transport address pair.

Sharing of information between networked computers is typically handled in a layered fashion, with each layer responsible for a different aspect of the information transfer and providing a foundation for more application specific tasks performed by higher levels. Between the various network-oriented hardware which forms the lowermost physical network layer and the various application-oriented software which forms the application layer there is typically provided a network communication layer (the IP protocol in the specific case of the Internet and internet-compatible networks), which provides a means of identifying network nodes and routing a datagram from a particular source node to a particular destination node. The actual contents of the datagram typically includes data that is associated not just to a particular node, but also to a particular process or endpoint associated with that node. Thus, the Network layer is typically followed by a Transport layer which defines an end to end connection between a particular process (or "source endpoint") at the source node and a corresponding process (or "destination endpoint") at the destination node.

In the case of the Internet, a Transport layer can utilize several different protocols, the best known of which is the Transmission Control Protocol (or simply "TCP"). TCP provides not only a means of associating individual processes at a particular node into respective "ports", but also a means of reliably transporting a stream of information packets ("datagrams") over an underlying Internet Protocol (or simply "IP") layer from a source endpoint to a destination endpoint, with each TCP/IP logical "connection" being defined by a pair of source and destination transport addresses each consisting of an associated IP address and port number.

Stream Control Transmission Protocol (or "SCTP") is a more advanced transmission protocol which is capable of transmitting multiple related streams between a source port at the transmitting node and a destination port at the receiving node preferably using multiple IP addresses at one or both nodes to thereby define a single logical SCTP "association". SCTP's provision for multiple related streams between the same two logical endpoints facilitates adaptive bandwidth and error correction for real-time information having components with differing priorities, while its provision for multiple IP addresses facilitates routing changes during transmission due to congestion or hardware malfunctions at the source or the destination. All transport addresses at the same end of an SCTP association must use the same port number, but can use different IP addresses. A transport address at either end of an active SCTP association must not be used by another active SCTP association. Thus, although each active SCTP association may be associated with multiple transport address pairs, all the transport address pairs of the same active SCTP association are uniquely associated with only one local SCTP endpoint.

The use of port numbers in the TCP and SCTP protocols to distinguish between logically independent streams of information that may be concurrently originating from a common source and/or destined to a common destination greatly enhances the utility of the network without adding substantially to the overhead information being transported between the two nodes. In practice, a unique port number assignment is typically not permanently established for each instance of each process, but rather a given port number will typically be associated with different processes (or different instances of the same process) at different times (or even with more than one concurrent connection, in the case of TCP), and thus there is no simple correlation between the source and destination Transport Addresses contained in the datagram header, and the local process or endpoint for which the received datagram is intended. In particular, in the case of TCP, the same destination Transport Address can be associated with more than one destination endpoint, while in the case of SCTP, the same destination endpoint can be associated with more than one destination Transport Address. Moreover, there is a possibility of "bogus" datagrams being received at the same local port as a genuine datagram, but from a different source.

SUMMARY

In one embodiment, a content addressable device contains a plurality of cells (registers) which may be addressed in parallel, such that only a cell matching a specified search string including a specified transport address will respond with a corresponding Endpoint Association ID that is stored in the cell together with that transport address. The content addressable device may also be used for determining the associated transport address in response to a specified valid association id.

In a second embodiment, multiple stages of partitioned content addressable devices are employed, with only a portion of the transport address pair information being used to access the first stage in a first parallel operation and at least a portion of the output from the first stage being used to select the appropriate second stage. In other embodiments, a partitioned stage of content addressable devices may be preceded by logic that analyzes at least a portion of the transport address to identify the relevant content device in the successive stage.

DETAILED DESCRIPTION

It should be understood that the intended audience for this specification will be familiar with conventional technology for transmitting and receiving digital information over the Internet (or other communications networks) and with the various standards and protocols that are commonly used for such transmissions such as "TCP" and "IP", and will be familiar with the technical jargon commonly used by those skilled in the art to describe such technology. Accordingly, unless otherwise clear from the context, it should be assumed that the words and phrases in this description and in the appended claims are used in their technical sense as they would be understood by those skilled in the art.

Figure 1:
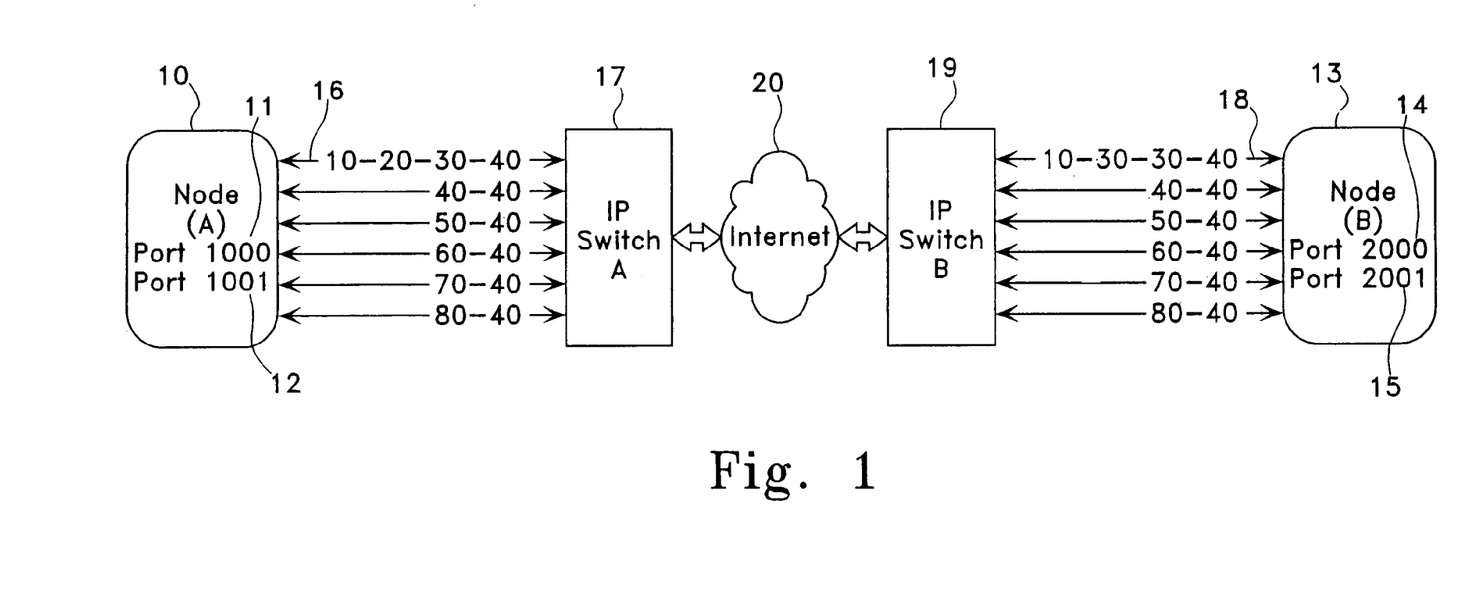
FIG. 1 depicts multiple datagram routings between two nodes in a conventional network.

Reference should now be made to FIG. 1, which shows an exemplary network connecting NodeA 10 and its associated logical ports 1000 11 and 1001 12 with NodeB 13 and its associated logical ports 2001 14 and 2002 15. NodeA 10 is a multi-homed node, with six associated IP addresses 16 designated respectively 10.20.30.40, 10.20.40.40, 10.20.50.40, 10.20.60.40, 10.20.70.40, and 10.20.80.40 all connected to IP SwitchA 17. Similarly, NodeB 13 is a multi-homed node, with six associated IP addresses 18 designated respectively 10.30.30.40, 10.30.40.40, 10.30.50.40, 10.30.60.40, 10.30.70.40, and 10.30.80.40 all connected to IP SwitchB 19. The two IP switches 17,19 are connected over the Internet 20 or other network over which data packets are transported using the conventional Internet Protocol ("IP").

It has been discovered that there is a need to provide a local mechanism for determining whether a particular local process is currently active for the particular combination of source and destination IP addresses and Port numbers (the "Transport Address Pair") specified in each incoming datagram, and if it does exist, to identify that particular local process as the datagram's logical "Endpoint Association" at the receiving node. A logical "Endpoint Association" as used herein provides a convenient local identity for one or more related streams of information flowing between a local process and a remote process, and subsumes either a TCP logical "connection" or a SCTP logical "association".

Thus a logical listing of one set of possible connections active at a given point in time between NodeA and NodeB could include the following ephemeral local Endpoint Associations at NodeA:

[Source IP+poret][DestinationIP+Port]

Endpoint Association 81:[(10-20-50-50)+(1000)][(10-30-30-40) +(2000)]

Endpoint Association 182:[(10-20-30-40)+(1001)] [(10-30-50-40) +(2001)]-[(10-20-60-40)+ (1001)][(10-30-60-40)+(2001)]

Note that the associations are typically listed in numerical order (for example, by means of a linked list in which each active association includes a pointer to the next active association) and typically there will be gaps in the numerical sequence corresponding to connections which have been torn down and the associated number has not yet been assigned to another active connection. Since each Transport Address Pair of a TCP association or a SCTP association has two IP addresses and two (service) port numbers (loosely speaking a port is a processing entity representation), and since Endpoint Association 182 has two source Transport Addresses and two Destination Transport Addresses, Endpoint Association 182 actually encompasses four available Transport Address Pairs:

182:1[(10-20-30-40)+(1001)], [(10-30-50-40)+ (2001)]

182:2[(10-20-30-40)+(1001)], [(10-30-60-40)+ (2001)]

182:3[(10-20-60-40)+(1001)], [(10-30-50-40)+ (2001)]

182:4[(10-20-60-40)+(1001)], [(10-30-60-40)+ (2001)]

One can have an unequal number of transport addresses for the source and destination. In this example they happen to be equal. As noted previously, these association numbers are of local significance only. The connection between NodeA and NodeB associated with local association number 81 at Node A is not necessarily represented with the same local association number at Node B.

Conventionally, this required association of the individual received datagrams to their respective local endpoint processes has been inherently sequential, involving not only multiple search keys, but also ever increasing numbers of data streams converging on a single host. Since more data must be processed in less time, the difficulty of matching a particular local port number, local IP address, remote port number and remote IP address can be expected to increase to the point that this correlation task becomes the limiting factor in the number of separate external communications that can be handled by a single host computer. In a typical transport protocol such as TCP or SCTP or UDP, all transport addresses used by a particular local endpoint must use the same local port number, and thus the local port ID can be used as a simple index key to all the active local process endpoints associated with that local port number, but any straight optimization of such a simple index scheme for rapid access requires a separate entry in high speed RAM for each legal port address whether or not actually in use and thus is wasteful of server memory.

Figure 2:
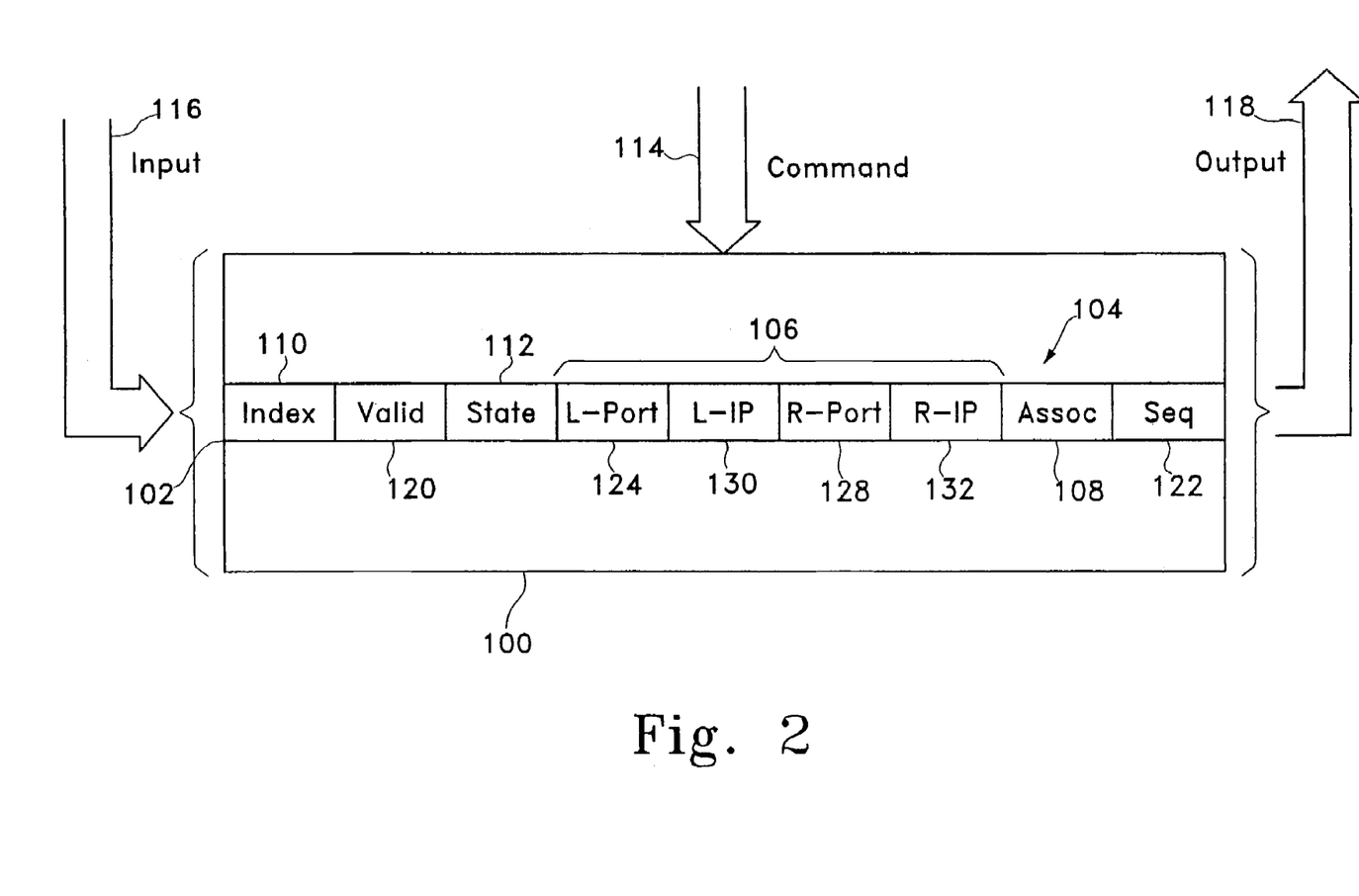
FIG. 2 depicts an exemplary embodiment in the form of a single array of basic cells and associated input, output and command buses.

Reference should now be made to FIG. 2 which depicts a first exemplary array 100 of basic data cells 102 which cooperate to form a parallel access memory device within a particular endpoint node 10,13. The entire contents of array 100 can thus be examined in a few parallel accesses rather than many sequential accesses. One example of such a parallel access memory device is the commercially available content addressable memory hardware which is used to interpret routing codes in packet-switched telephone networks.

Each basic cell 102 includes a register record 104 which includes data representing a particular transport address pair 106 (in the form "Local Port Number"+"Local IP Address"+ "Remote Port Number"+"Remote IP number") plus an associated "Association ID" 108. Preferably, each record 104 also includes other fields such as "index" (Address) field 110 which may function as the local address of that record in the hardware device 100 and which may be hardcoded at time of manufacture. As described in more detail hereinafter, hardcoded index 110 provides a convenient mechanism for detecting and correcting invalid data, or for replacing obsolete data that corresponds to an old connection that is no longer active with current data corresponding to a newly established active connection, especially if the individual cells 102 of array 100 are addressable only by content. Another useful field is "State" 112, which can be used to identify a connection that is in the process of being set up or torn down, as well as a connection that is known to be bogus or a recently deactivated connection that is no longer available for use.

One function of array 100 is to respond to a SEARCH command on command bus 114 and a particular search query on data input bus 116 by outputting on output bus 118 the association ID data from the cell 102 containing a matching transport address, while ignoring all cells that do not contain matching data. Data Input bus 116 is also used to enter or update the transport address and association ID data in cell 102 in response to a WRITE command on command bus 114. Since the SEARCH or WRITE operation will typically be relevant only to a particular designated field or a particular designated cell, the command will be accompanied by one or more parameters (such as a search field defining mask or a cell index address) which may be also present on the command bus 114 or on the Data Input bus 116. Since the same search field mask is likely to be used in many consecutive search operations, the number of required operational cycles and/or the data capacity of the individual busses may be reduced by providing for supplemental commands in which the same mask data is used in a subsequent SEARCH and/or the same or a next cell address is used in a subsequent WRITE.

The above assumes that there will be one and only one cell 102 with data 104 matching a particular search query; however, by accident or design, that perhaps may not always be the case. One possible example of a mechanism for detecting invalid or conflicting responses to a particular SEARCH command would be to include a Valid bit 120 that is reset to FALSE (i.e., a logical "0") and when valid data is entered into that cell and a Checksum field that is dependent on the number of TRUE data bits (i.e., bits that are equal to "1") in that cell. Assuming that the respective data bits of all cells responding positively to a particular SEARCH are ORed onto corresponding bit positions on output bus 118, the resultant output may be considered invalid unless the ORed valid bit output is also a logical "0" and the ORed checksum output is equal to the computed checksum of the ORed data. Similarly, an output of all 0's will indicate that no cell 102 contained data in the designated fields that exactly matched the particular SEARCH query. Another possible use for valid bit 120 is to conserve power. If valid bit 120 is FALSE, then the rest of the data record 104 in the corresponding cell 102 may be safely ignored in at least some applications, and the power that otherwise be consumed for reading and refreshing that ignored information may be disconnected from the involved semiconductor circuitry. Similarly, if all the valid bits 120 in a particular hardware array 100 of cells 102 are FALSE, that hardware may be placed in a power saving standby mode.

Although one use of parallel access array 100 is to verify that a particular received transport address corresponds to a current active association, in one preferred embodiment, the SEARCH command can specify other fields to be matched and/or other fields to be output. For example, in the case of SCTP or other transport protocol which permits a change of remote IP address if a malfunction is detected at the original address, the association ID may be used (instead of transport addresses) to locate such an alternate transport address for use in future transmissions to the same remote endpoint. In that case, in order to prevent multiple responses and possible garbling of output data as input to this hardware device, rather than multiple transport addresses belonging to a common association with the same association id, each instance of the same entry association ID is preferably provided with a different sequential suffix 122.

Consider the case of an SCTP association 81:2-81 represented by a local association ID (or local endpoint) 81 with 3 local IP addresses L-IP1, L-IP2, L-IP3 and a local port L-Port; and a remote association ID 2-81 with 3 remote IP addresses R-IP1, R-IP2, R-IP3 and a remote port R-Port. Three local IP addresses and three remote IP addresses all associated with the same connection produce a total of 9 transport address pairs:

81:1 L-IP1+L-Port+R-IP1+R-Port
81:2 L-IP2+L-Port+R-IP1+R-Port
81:3 L-IP3+L-Port+R-IP1+R-Port
81:4 L-IP1+L-Port+R-IP2+R-Port
81:5 L-IP2+L-Port+R-IP2+R-Port
81:6 L-IP3+L-Port+R-IP2+R-Port
81:7 L-IP1+L-Port+R-IP3+R-Port
81:8 L-IP2+L-Port+R-IP3+R-Port
81:9 L-IP3+L-Port+R-IP3+R-Port From the previous description it will be noted that Valid bit 120 will be set to TRUE for all 9 entries, and all 9 entries will have same local association number 81. Similarly, remote association number 2-81 will have 9 associated transport address pairs, but not necessarily represented by the same association ID (since these are used only locally and are not typically communicated over the network) and not necessarily stored in the same type of hardware or processed with the same software.

In the example of FIG. 2, association 81 may be represented by entries whose indexes 110 (local addresses of the device 100) are 19, 22, 09, 25, 89, 1002, 2001, 3020 and 4040. These numbers are useful in overall addressing and management and partitioning for optimization, as will be explained in more detail below.

Figure 3:
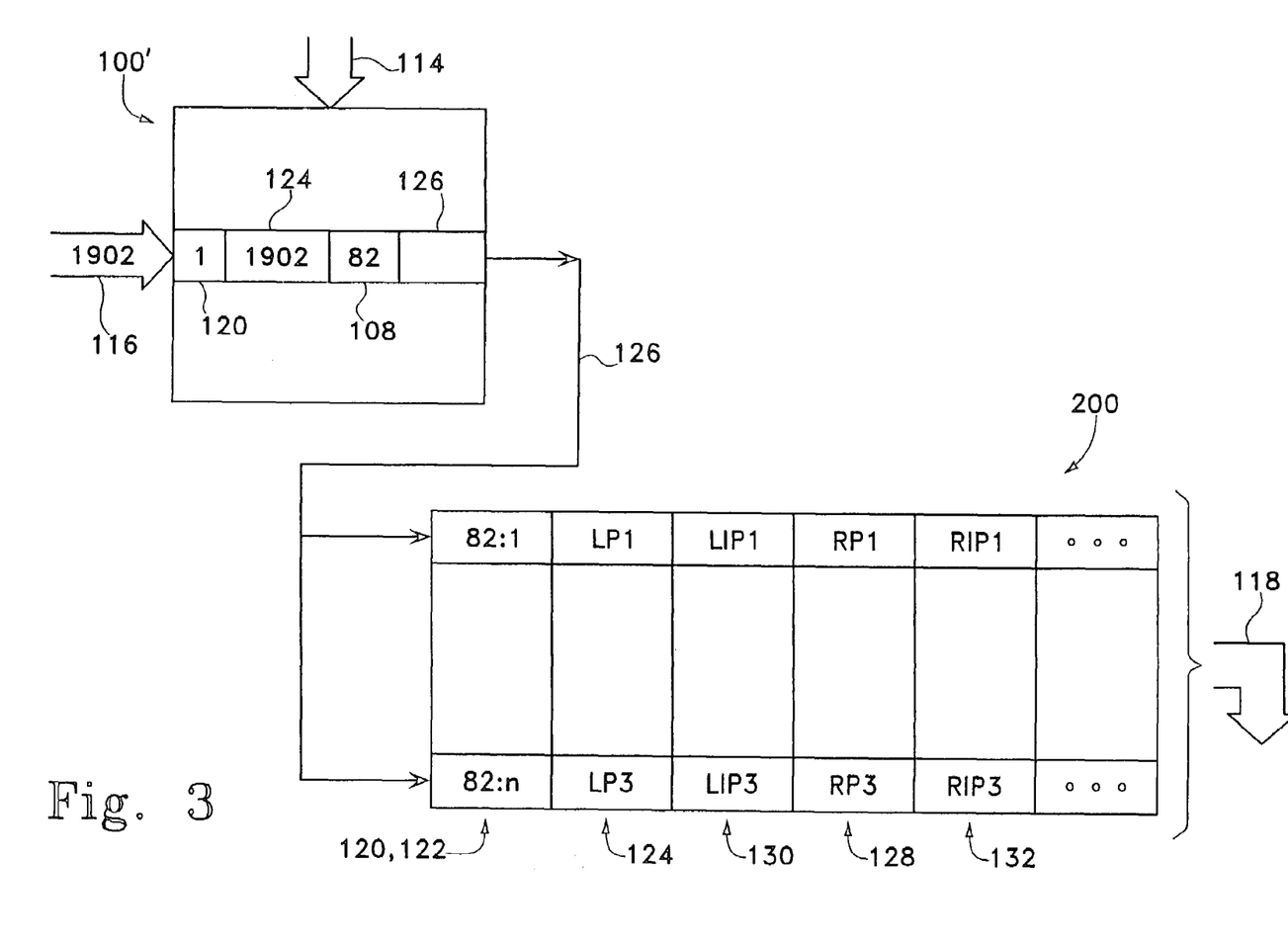
FIG. 3 depicts another exemplary embodiment in the form of multiple arrays of data cells arranged to output a matching port number in a first stage pointing to a set of corresponding association IDs in a second stage.

Reference should now be made to FIG. 3 which depicts one embodiment of an association ID determining system for SCTP endpoints which is based only on the local port number (e.g. local port 1902) which uniquely identifies an SCTP end point (e.g. endpoint 82). As shown, each valid entry in table 100' corresponds to a different port 124 and a different endpoint 108, together with a pointer 126 to a separate association table 200 (possibly implemented as a defined table segment of a larger composite table) listing all the transport addresses with that particular endpoint. Table 100' is also useful for verifying, before creation of a new endpoint to be associated with a specified local port, whether that port is actually available for use. For example, by simply searching for any valid association with port 1902, a non-zero output with the valid bit 120 set to "1" will indicate that the port is currently in use. As depicted, Table 100' is implemented by a parallel access memory device similar to device 100 of FIG. 2, while Table 200 may be implemented as a defined segment of sequentially searchable RAM. Such a mixed parallel and serial implementation may be particularly advantageous when there are many local ports 124 available for use, but each connection 104 typically involves only a few different transport addresses 106.

Figure 4:
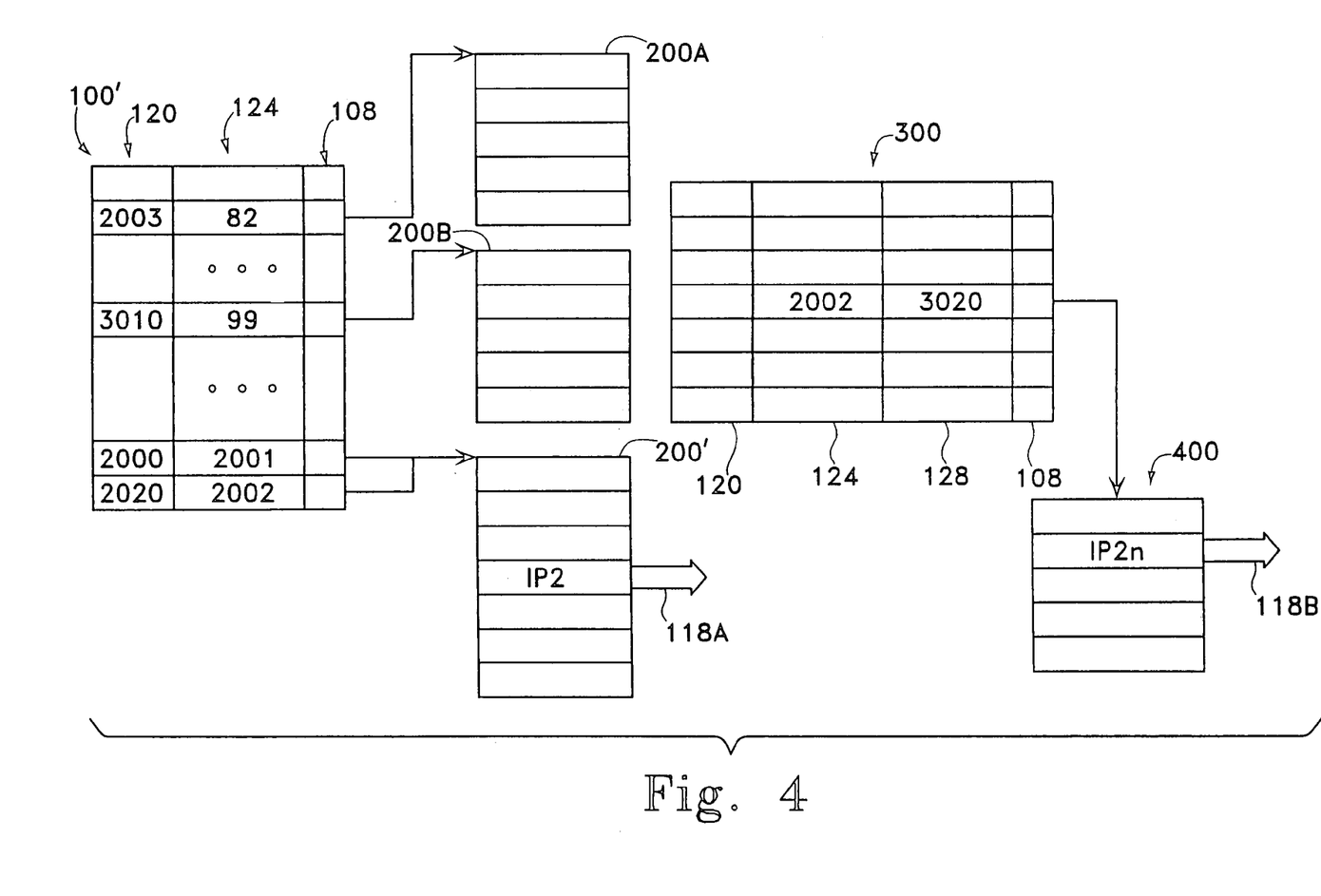
FIG. 4 depicts yet another exemplary embodiment in the form of staged array modules including a first stage which is searched by a first matching criteria, with each valid cell of the first stage linked to a respective one of several modules in a second stage that is searched by a second matching criteria.

As will be evident from FIG. 4, the staged implementation of FIG. 3 can be modified to provide a convenient mechanism for modular expansion of parallel access association determining hardware, thus permitting more transport protocol related data to be rapidly accessible for more connections than would be otherwise practical. The first level 100' can be limited in length to the maximum number of local ports that will be in use at any given point in time, and does not necessarily include any other transport address information, so it may have substantially smaller width than the example of FIG. 2. Accordingly it could possibly be even faster and/or use less power. In addition, even more local ports 124 can be accommodated, for example by a parallel modular organization of more than one such first stage module using parity or other simple hash scheme such that ports of even parity are contained in one module and ports of another parity are contained in another module. Alternatively, a simple overflow algorithm could be employed wherein the additional ports are temporarily indexed in conventional memory using a conventional software indexing approach in the event that more ports are concurrently in use than can be accommodated in the content addressable array.

In many applications, it is not sufficient to merely convert a local port number 124 into a local association number 108 and the FIG. 3 embodiment therefor contemplated a separate table (or table segment) 200 of associated transport addresses 106 for each active local port. In the FIG. 4 embodiment, that separate table or table segment 200 is implemented within a second stage 200' of content addressable memory which may be shared by more than one such table segment 200, and the association ID 108 output from the prior stage 100' is used to form a series of searches, each with the same association ID 108 (e.g., 81) but with a different sequence number 122 (e.g., 81:1, 81:2), until a matching valid transport address pair is found that has been assigned (or is available for assignment) to the intended local process or until the combination of association ID and sequence number returns a null transport address indicating that no other transport addresses have been assigned to that association ID. As indicated in FIG. 4, such a staged implementation also permits additional second stage modules 200A, 200B to be added to increase capacity without sacrificing either speed or power. In particular, since each local or remote transport address includes both a logical port number 124, 128 and one or more physical IP addresses 130, 132, there will typically be more local transport addresses than local endpoints, and thus it can be anticipated that even if only one first stage module is required, for optimal performance more than one second stage module would be desirable. In that case, several different active ports can be linked to the same second stage module in a straightforward manner, for example as shown, the cells containing ports 2001 and 2002 in first stage module 100' are both linked to the same second stage module 200' by a corresponding pointer or index key 126. Even though two searches are now performed in sequence, the individual search arrays are smaller and faster, and the overall efficiency is improved. In some server applications, there can be as many 32000 associations or more each with an average of 6 IP addresses. In that case the described modular approach of FIG. 4 with hardware assisted parallel search in each module is clearly advantageous over either a more sequential software approach or a more straightforward monolith hardware approach.

In the particular embodiment shown in FIG. 4, the overall arrangement is further compartmentalized and modularized by means of a third stage 300 and a fourth stage 400. Each module of third stage 300 contains the remote ports associated with a particular range of local ports in first stage 100'. In another embodiment, an expanded modular implementation could include additional intermediate stages between first stage 100' and second stages 200', with intermediate index keys 126 pointing to the appropriate array in any subsequent stage. In addition, provision can be made for migration of entries within stage fragments (arrays) of that particular stage hierarchy, for example, migration of 2 or more busy associations 82, 99 to different arrays 200A, 200B to permit parallel access of the association information and thereby reduce contention. In general, although the same remote port number may be associated with more than one remote node, each active connection will have only one local port and one remote port; thus the number of remote port entries in third stage 300 will be on the same order of magnitude as the number of local port entries in first stage 100', the same modular organization may be applied to both stages, and there can be a simple 1:1 correlation of first stage module to third stage module. Each cell of the third stage will contain data for a different pair of local port and remote port, and a pointer to the appropriate fourth stage module contains the remote IP address information for that particular pair. It should be noted that because of the structural parallelism between the first two stages 100', 200, and the last two stages 300, 400, it is possible to search simultaneously in stages 100 and 300, and then in stages 200 and 400. Thus the apparent additional complexity of the four stages does not materially increase the search time beyond the simpler two stage implementation of FIG. 3. On the other hand, because the local IP addresses are stored and accessed separately from the remote IP addresses, the total storage is substantially reduced and the overall efficiency is thereby increased. In that regard, it will be noted that in FIG. 3, for a single connection involving 3 IP addresses at each endpoint, there would be a total of 9 separately stored transport addresses in table segment 200, each requiring a separate entry containing two IP addresses. In contrast, the same IP address connection information can be stored in the FIG. 4 embodiment in tables 200' and 400 with a combined total of only 6 entries, each containing only one IP address.

Many aspects of the various described embodiments are applicable not only to SCTP, but also to TCP, UDP, IP and other layers in TCPIP protocol, and can readily be extended to other similar transmission protocols requiring verification and matching of remotely identified transport addresses with locally defined processes at a high processing rate and with a low latency. Thus, as data is received from the external network, it can be directly fed to the described parallel access device or devices, the local association and other pertinent connection oriented data can be determined, and by the time the full packet/frame/datagram has arrived and is available for processing by the local processing entity, the required association information is already available.

In addition to the SEARCH command which is used to locate an active association associated with a particular transport address or to verify that such an association does not currently exist based on data previously stored in the individual cells 102 of individual hardware devices 100, mention has been made of State field 112 and Valid bit 120, which are also searchable and are useful in setting up and maintaining the stored data in combination with hardcoded Index field 110 and the WRITE command. Alternatively, the Index field 110 of a single stage implementation could be just an internal address of the cell 102 and for implementations with more than one stage, the index field could point to internal indexes of other stages.

Figure 5:
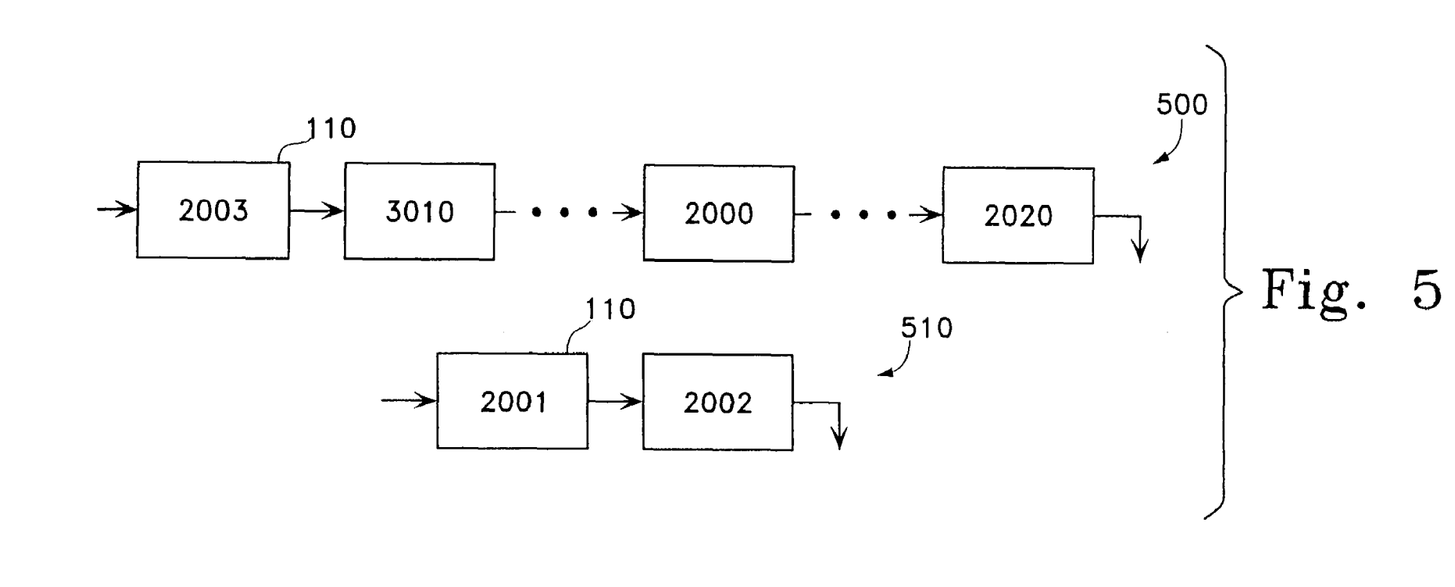
FIG. 5 depicts an embodiment of linked lists of free and allocated cells for use in maintaining data cells associated with new, established, and/or obsolete connections.

In the embodiment shown in FIG. 5, when the host boots it creates FREE list or a data structure 500, with a corresponding sequential entry for each Index 110 (e.g., 2003, 3010, etc.) that is available for use by a new association, and a complementary empty ALLOCATE list 510 which lists the Index 110 for those cells 102 that are currently already allocated to an existing connection. If the maximum number of hardware searchable associations (number of different available local ports) is the aforementioned 32000 that could be provided in a large server, the FREE list 500 will initially include Index numbers from 0 to 31999, with each corresponding cell in the array 100 having an initial Valid bit 120 reset to "0" or FALSE. Each time an association is established, that association will be assigned to the cell with the next FREE index number 110 (possibly the same as the association ID 108 if the hardware assisted parallel search capacity of device 100 is such that no software overflow capability will ever be required), the transport address and other linked data will be written into the appropriate fields of the assigned cell, the Valid bit 120 of that cell will be set to TRUE, and the corresponding index number of the assigned cell will be moved from the FREE list 500 to the end of the ALLOCATE list 510. Conversely if an association is being torn-down (shutdown-ACK or shutdown-ACK-complete), then that association number is used as the search key to locate the Index numbers for all entries corresponding to that association. The corresponding entries in the ALLOCATE list are then moved to the end of the FREE list, and the state entry in each corresponding cell is changed to DISCONNECTED. The other cell data may be left intact until the cell is needed to store data for another connection, since the old data may be useful to certain applications, for example in discarding genuine but no longer needed datagrams that were received only after the connection was torn down, or in detecting potentially hostile intrusion attempts.

In the embodiment depicted in FIG. 5, the entries are listed in time order, which facilitates retention of information about a connection that is no longer active and thus occupies a cell that is FREE for assignment, until that cell is actually required for another connection. In other embodiments, the ALLOCATE and FREE lists are not necessarily implemented as simple linked lists that are accessed serially. Especially in a server with many transient connections that are established only for a very short period of time, such a sequential implementation may not be the most efficient, and these lists may be better implemented with a more complex data structure (for example with back pointers from the referenced data cells to the individual list entries) and/or with content addressable hardware, so that any particular entry (and not just those at the beginning or end of the lists) may be quickly found and moved as required. Alternatively, rather than maintain a separate list 510 of allocated entries, the Valid bit 120 could can be set to TRUE or FALSE and a corresponding entry deleted from or appended to an appropriate data structure. DISCONNECTED entries are useful for management and security purposes. If an external system management function determines that data from a particular IP, PORT, or association should be ignored, that information can be also maintained. These different possibilities can be identified by means of different values in the STATE field. Alternatively this information can be maintained in one or more separate devices or separate data structures, thus permitting a more optimal use of the content addressable hardware for the primary function of correlating transport address information with association/connection information.

FREE list 500 is also useful for establishing table entries for recently encountered bogus transport addresses, with the State field 112 set to BOGUS. In that case, the cell is still free for possible allocation to a genuine connection and the corresponding index entry 110 is simply moved from the beginning to the end of the FREE list 500.

In a multiprocessor or multi-node or cluster processing environment, these various data-structures and processes may be readily distributed and/or multiple copies may be maintained. Doubtless, other modifications and enhancements will be apparent to those skilled in the art. For example, different association processes can be invoked depending on the state of node, or that are specific to a particular port or IP address. Moreover, many of the described novel features may be applicable not only to the SCTP transport layer of a conventional TCP/IP stack, but to other transport protocols such as TCP, UDP, IP, ICMP. In other applications, the described hardware device is not necessarily responsible for all possible connections, but rather merely serves as a cache for TCPIP association/connection lookup and management. In that case, if the device runs out of entries, a DEVICE_FULL flag may be set, and if an association is not found in the device's CONNECTED or DISCONNECTED areas, the search may be completed in conventional memory.

The invention claimed is:

1. Hardware for correlating a transport address pair with a local endpoint association, comprising:
 a plurality of content addressable data cells, each including an index field, a first data field for storing at least a portion of a transport address pair, and a second data field for storing at least a portion of a corresponding local endpoint association id;
 a command bus; and
 a data bus,
 wherein:
 in response to a first SEARCH command on the command bus, if one and only one cell has matching valid transport address data in the first field, the local association data in the second field of that one cell is output on the data bus,
 in response to a second SEARCH command on the command bus, if one and only one cell has matching valid local association data in the second field, the transport address data in the first field of that one cell is output on the data bus, and
 in response to an LOAD command on the command bus, the data in the first and second data fields of a cell with a matching index field is loaded with corresponding data from data bus.

2. The hardware of claim 1, wherein each cell has an associated valid bit, and if all the valid bits in a particular array of cells is FALSE, then that array is operated in a standby mode.

3. The hardware of claim 1, wherein the information in the index field of each cell is a respective hardcoded address for that cell.

4. The hardware of claim 3, further comprising a FREE list of the addresses of those cells which are free for allocation to new connections.

5. The hardware of claim 4 wherein said FREE list is a sequential list with a first end to which newly freed cells may be added and a second end from which previously added cells may be removed.

6. A staged hardware arrangement for correlating a transport address pair with a local association, comprising:
 a plurality of second stage arrays of content addressable data cells, each second stage cell being configured to contain at least a second portion of a respective said transport address pair; and
 a first stage of content addressable data cells, each first stage cell being configured to contain at least a first portion of a respective said transport address pair and a pointer to a particular one of second stage arrays including the second portion of that respective transport address pair.

7. The hardware arrangement of claim 6, wherein the first portion includes a local port ID.

8. The hardware arrangement of claim 6, wherein each of the data cells in the second stage is also configured to contain any local association ID currently associated with that respective transport address pair.

9. The hardware arrangement of claim 6, further comprising:
- first means for outputting local association data in response to transport address data;
- second means for outputting transport address data in response to local association data; and
- third means for loading transport address data and local association data in response to a matching index field.

10. The hardware arrangement of claim 6, wherein the same second stage array contains information for more than one said local port ID.

11. The hardware arrangement of claim 10, wherein two different said second stage arrays are searched concurrently for respective information for two different said local port IDs.

12. A modular hardware arrangement for correlating a transport address pair with a local endpoint association, comprising:
- a plurality of second stage arrays of content addressable data cells, each second stage cell being configured to contain only a first portion of a transport address pair;
- at least one first stage array of content addressable cells, each first stage cell being configured to contain endpoint data including a local port ID and linked to one of the second stages;
- a plurality of fourth stage arrays of content addressable data cells, each fourth stage cell being configured to contain only a second portion of a transport address pair; and
- at least one third stage array of content addressable cells, each third stage cell being configured to contain endpoint data including a remote port ID and linked to one of the fourth stages.

13. The modular hardware arrangement of claim 12, wherein each external transport address includes a local port ID, a remote port ID, a local IP address, and a remote IP address.

14. The modular hardware arrangement of claim 13, wherein a search for the local IP address portion of said transport address pair may be performed in said first and second stage arrays concurrently with a search in said third and fourth stage arrays for the remote IP address portion of that same transport address pair.

15. A hardware-based method for correlating a transport address pair with a local association, comprising:
- configuring each of a plurality of second stage arrays of content addressable data cells to contain at least a second portion of a respective said transport address pair: and any local association ID currently associated with that respective transport address pair;
- configuring each of plurality of first stage content addressable data cells to contain at least a first portion of a respective said transport address pair including a local port ID and a pointer to a particular one of second stage arrays including the second portion of that respective transport address pair;
- applying at least the first portion of a particular transport address pair in parallel to all of the cells of the first stage;
- outputting from the first stage a corresponding pointer to a corresponding second stage array that includes the second portion of that respective transport address pair;
- applying to said corresponding second stage array at least the second portion of said particular transport address; and
- outputting from the corresponding second stage array the local association ID associated with the particular transport address.

16. The method of claim 15 further comprising outputting transport address data in response to local association data.

17. The method of claim 15 further comprising loading transport address data and local association data in response to a matching index field.

18. The method of claim 15 wherein at least said second stage is a modular arrangement of multiple stages.

19. The method of claim 15 wherein one search is performed in said first stage concurrently with a different search in the second stage.

* * * * *

UNITED STATES PATENT AND TRADEMARK OFFICE
CERTIFICATE OF CORRECTION

| | | |
|---|---|---|
| PATENT NO. | : 7,359,381 B2 | Page 1 of 1 |
| APPLICATION NO. | : 10/769183 | |
| DATED | : April 15, 2008 | |
| INVENTOR(S) | : Srinivas Gadde | |

It is certified that error appears in the above-identified patent and that said Letters Patent is hereby corrected as shown below:

In column 3, line 42, delete "(10-20-50-50)" and insert -- (10-20-50-40) --, therefor.

In column 3, line 46, after "[(10-30-50-40) + (2001)]" delete "-" and insert -- + --, therefor.

Signed and Sealed this

Twenty-third Day of September, 2008

JON W. DUDAS
*Director of the United States Patent and Trademark Office*